US012630306B2

(12) United States Patent
Schwarz et al.

(10) Patent No.: US 12,630,306 B2
(45) Date of Patent: May 19, 2026

(54) SYSTEMS AND METHODS FOR MAINTENANCE OF A SPACECRAFT CONSTELLATION

(71) Applicant: MOMENTUS SPACE LLC, San Jose, CA (US)

(72) Inventors: Robert Erik Schwarz, Los Gatos, CA (US); Yash Chandramouli, Seattle, WA (US)

(73) Assignee: MOMENTUS SPACE LLC, San Jose, CA (US)

( * ) Notice: Subject to any disclaimer, the term of this patent is extended or adjusted under 35 U.S.C. 154(b) by 237 days.

(21) Appl. No.: 18/508,738

(22) Filed: Nov. 14, 2023

(65) Prior Publication Data

US 2025/0153866 A1     May 15, 2025

(51) Int. Cl.
*B64G 1/10*          (2006.01)
*B64G 1/64*          (2006.01)

(52) U.S. Cl.
CPC ......... *B64G 1/1078* (2013.01); *B64G 1/1085* (2013.01); *B64G 1/6462* (2023.08)

(58) Field of Classification Search
CPC ... B64G 1/1078; B64G 1/6462; B64G 1/1085
See application file for complete search history.

(56) References Cited

U.S. PATENT DOCUMENTS

| | | | | |
|---|---|---|---|---|
| 8,833,702 B2 * | 9/2014 | Briskman | ............... | G01S 7/003 |
| | | | | 244/158.6 |
| 10,435,183 B1 * | 10/2019 | Schwarz | ................ | B64G 1/643 |
| 10,464,694 B1 * | 11/2019 | Schwarz | ................ | B64G 1/242 |
| 10,654,596 B1 * | 5/2020 | Eller | ........................ | B22F 3/003 |
| 2003/0036826 A1 * | 2/2003 | Turner | ................... | B64G 1/244 |
| | | | | 701/13 |
| 2013/0082146 A1 * | 4/2013 | Kofford | ............... | B64G 1/1081 |
| | | | | 244/158.7 |
| 2016/0087713 A1 * | 3/2016 | Oderman | ........... | H04B 7/18591 |
| | | | | 705/40 |
| 2018/0148197 A1 * | 5/2018 | Halsband | ................. | B64G 1/26 |
| 2018/0186476 A1 * | 7/2018 | Poncet | ................... | B64G 1/402 |
| 2019/0077523 A1 * | 3/2019 | Faber | ................... | B64G 1/4021 |
| 2019/0389602 A1 * | 12/2019 | Schilling | .................. | B64G 1/26 |
| 2020/0062426 A1 * | 2/2020 | Drexler | .................. | B64G 1/408 |
| 2020/0106605 A1 * | 4/2020 | Mord | ..................... | H04L 9/0825 |
| 2022/0081133 A1 * | 3/2022 | Fukushima | .......... | B64G 1/1081 |
| 2022/0094431 A1 * | 3/2022 | Kaen | ........................ | H04B 7/19 |
| 2022/0227504 A1 * | 7/2022 | Lindsay | ................ | B64G 1/645 |
| 2022/0402635 A1 * | 12/2022 | Mukae | ................. | B64G 1/2429 |
| 2023/0286678 A1 * | 9/2023 | Warnock | ............... | B64G 1/428 |
| 2024/0267117 A1 * | 8/2024 | Guiney | ............. | H04B 7/18539 |
| 2024/0425206 A1 * | 12/2024 | Hui | ...................... | B64G 1/2427 |

* cited by examiner

*Primary Examiner* — Hussein Elchanti
(74) *Attorney, Agent, or Firm* — MARSHALL, GERSTEIN & BORUN LLP

(57) ABSTRACT

A system for maintenance of a spacecraft constellation comprises a first spacecraft, configured to perform a primary mission while maintaining a primary orbit, and a second spacecraft. The second spacecraft is configured to perform the primary mission while maintaining the primary orbit and to determine a failure of the first spacecraft. The second spacecraft is further configured to, at least in part responsive to determining the failure of the first spacecraft, perform a secondary mission, wherein the secondary mission includes removing the first spacecraft from the primary orbit by the second spacecraft.

29 Claims, 6 Drawing Sheets

600

```
┌─────────────────────────────────────────────────┐
│ PERFORMING, BY A FIRST SPACECRAFT, A PRIMARY     │ ⟋ 610
│ MISSION WHILE MAINTAINING A PRIMARY ORBIT        │
└─────────────────────────────────────────────────┘
                        │
                        ▼
┌─────────────────────────────────────────────────┐
│ PERFORMING, BY A SECOND SPACECRAFT, THE PRIMARY  │ ⟋ 620
│ MISSION WHILE MAINTAINING THE PRIMARY ORBIT      │
└─────────────────────────────────────────────────┘
                        │
                        ▼
┌─────────────────────────────────────────────────┐
│ DETERMINING, BY THE SECOND SPACECRAFT, A FAILURE │ ⟋ 630
│ OF THE FIRST SPACECRAFT                          │
└─────────────────────────────────────────────────┘
                        │
                        ▼
┌─────────────────────────────────────────────────┐
│ PERFORMING, BY THE SECOND SPACECRAFT AND AT      │ ⟋ 640
│ LEAST IN PART RESPONSIVE TO DETERMINING THE      │
│ FAILURE OF THE FIRST SPACECRAFT, A SECONDARY     │
│ MISSION, WHEREIN PERFORMING THE SECONDARY        │
│ MISSION INCLUDES REMOVING THE FIRST SPACECRAFT   │
│ FROM THE PRIMARY ORBIT BY THE SECOND SPACECRAFT  │
└─────────────────────────────────────────────────┘
```

400

404

402

408

420

410e

410c

410f

410d

410a

410b

406

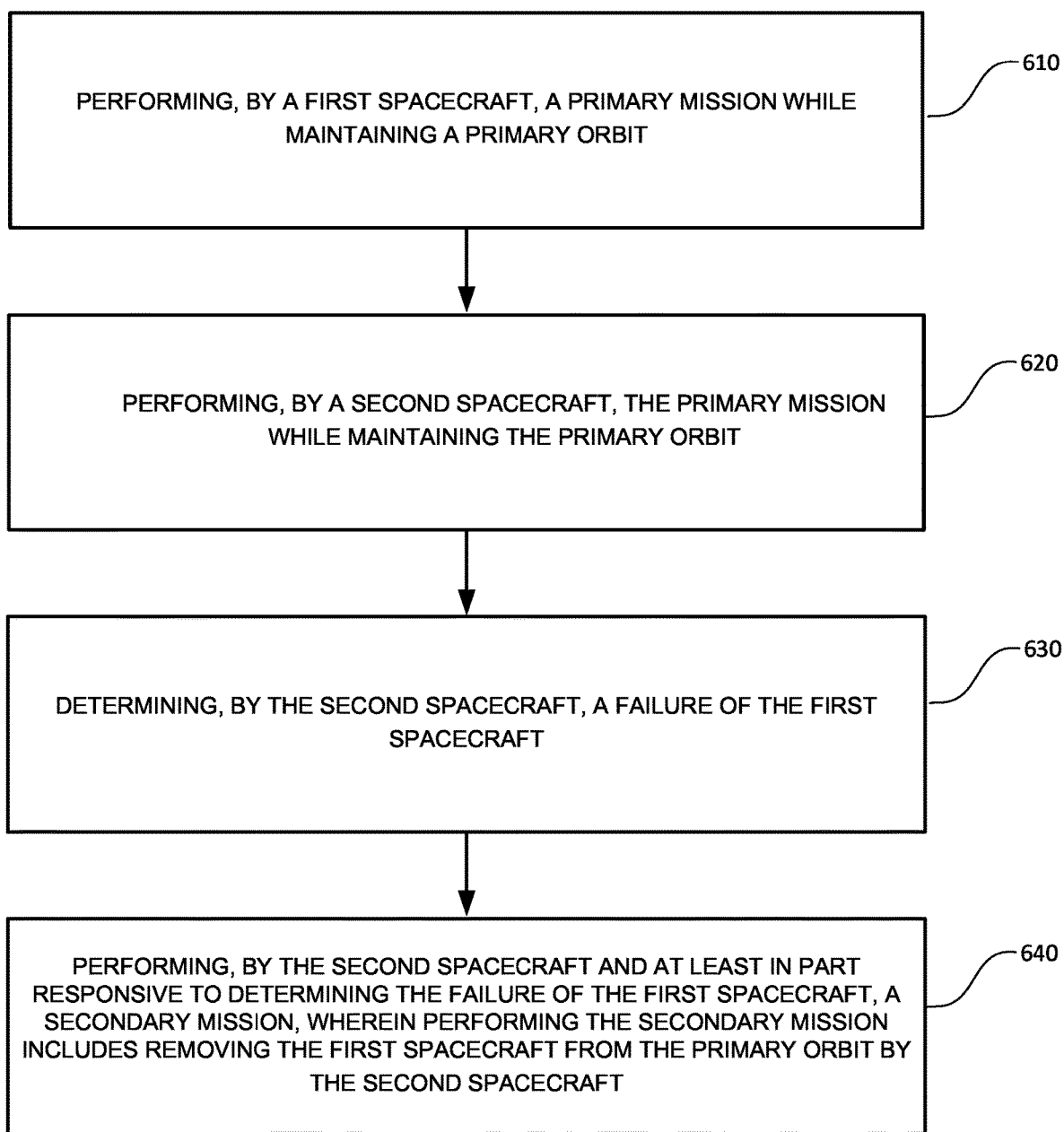

600

PERFORMING, BY A FIRST SPACECRAFT, A PRIMARY MISSION WHILE
MAINTAINING A PRIMARY ORBIT

610

PERFORMING, BY A SECOND SPACECRAFT, THE PRIMARY MISSION
WHILE MAINTAINING THE PRIMARY ORBIT

620

DETERMINING, BY THE SECOND SPACECRAFT, A FAILURE OF THE FIRST
SPACECRAFT

630

PERFORMING, BY THE SECOND SPACECRAFT AND AT LEAST IN PART
RESPONSIVE TO DETERMINING THE FAILURE OF THE FIRST SPACECRAFT, A
SECONDARY MISSION, WHEREIN PERFORMING THE SECONDARY MISSION
INCLUDES REMOVING THE FIRST SPACECRAFT FROM THE PRIMARY ORBIT BY
THE SECOND SPACECRAFT

SYSTEMS AND METHODS FOR MAINTENANCE OF A SPACECRAFT CONSTELLATION

FIELD OF THE DISCLOSURE

The present disclosure generally relates to spacecraft and, more specifically, to a system and method for efficient maintenance of a spacecraft constellation.

BACKGROUND

With increased commercial and government activity in Near Space, a variety of spacecraft and missions are under development. For example, a spacecraft with significant orbital transfer capabilities may be dedicated to delivering payloads such as satellites from one orbit to another, or cleaning up space debris, or making deliveries to space stations, etc. On the other hand, small and medium satellites may fulfill missions of communication, observing and measuring upper atmospheric regions, remote observation of Earth's surface, etc. Increasingly, constellations of satellites are deployed to work in concert to provide, for example, continuous communication, navigation, and situational awareness services. Inevitably, some satellites may malfunction and lose at least one of their critical functions. Such a satellite may then need to be removed from its orbit to avoid endangering other satellites and other types of spacecraft. Collisions between spacecraft in even moderately similar orbits may have relative velocities of tens of meters per second, almost guaranteeing destruction of the spacecraft and posing a hazard for other space objects. Even when collisions can be avoided, failed spacecraft may require other spacecraft to perform collision avoidance maneuvers, depleting delta-v resources (e.g., fuel) and decreasing efficiency and operational lifetime of the system. Designing and deploying efficient systems for performing space missions while maintaining a safe space environment remains a challenge.

SUMMARY OF THE DISCLOSURE

In one aspect, a system for maintenance of a spacecraft constellation comprises a first spacecraft, configured to perform a primary mission while maintaining a primary orbit, and a second spacecraft. The second spacecraft is configured to perform the primary mission while maintaining the primary orbit and to determine a failure of the first spacecraft. The second spacecraft is further configured to, at least in part responsive to determining the failure of the first spacecraft, perform a secondary mission, wherein the secondary mission includes removing the first spacecraft from the primary orbit by the second spacecraft.

In another aspect, a method for maintenance of a spacecraft constellation comprises performing, by a first spacecraft, a primary mission while maintaining, by the first spacecraft, a primary orbit. The method further comprises performing, by a second spacecraft, the primary mission while maintaining, by the second spacecraft, the primary orbit. Still further, the method comprises determining, by the second spacecraft, a failure of the first spacecraft. Still further, the method comprises, at least in part responsive to determining the failure of the first spacecraft, performing, by the second spacecraft, a secondary mission, wherein the secondary mission includes removing the first spacecraft from the primary orbit.

BRIEF DESCRIPTION OF THE DRAWINGS

FIG. 6 is a block diagram of an example method for maintenance of a spacecraft constellation.

DETAILED DESCRIPTION

The systems, methods, and spacecraft of this disclosure generally relate to a concept of a system for maintenance of a spacecraft constellation. The system may include a plurality of spacecraft configured to perform a primary mission and a secondary mission. The spacecraft may operate in a constellation or as another type of fleet. The primary mission may be or include, for example, communication, navigation, remote sensing, resource storage, and/or other tasks or operations, while the secondary mission generally focuses on maintaining safe operation of the system and/or other systems, spacecraft, etc. Maintaining safe operation may include removing malfunctioning and/or decommissioned spacecraft from an orbit where such spacecraft may pose a collision threat to other spacecraft within or outside of the system. The example configurations of the system may improve efficiency of system operation over previously known configurations by embedding within the system spacecraft that are configured to perform both the primary mission and system maintenance. Such spacecraft, which may be referred to as maintenance spacecraft, may be configured to have greater maneuvering and orbital transfer capability (e.g., in terms of greater total delta-v and more capable thruster systems) than other spacecraft within the system. The maintenance spacecraft may be configured to remove malfunctioning and/or decommissioned spacecraft from an orbit a primary orbit of operation, where such spacecraft may interfere with system operations. By obviating the need of other spacecraft to be configured for self-removal, the system, which may include maintenance spacecraft that are also configured to perform the primary mission, may improve operating efficiency of the system, safety of the space environment, energy, and cost of launch, etc.

Other methods for maintenance of constellations of spacecraft may include commissioning maintenance spacecraft that are not embedded in the constellations to remove spacecraft from the primary orbit of operation. For example, when a spacecraft failure occurs, a maintenance spacecraft may be launched from Earth to remove the failed spacecraft from the primary orbit. Such maintenance missions may take too long (e.g., months or years), increasing collision risk and/or resource depletion within the constellation, and/or or incur high costs (e.g., in fuel consumption) in an effort to decrease mission time. In another example, a maintenance spacecraft may be disposed at an orbit distinct from the primary orbit but with a suitable potential rendezvous time. For example, the maintenance spacecraft may be an orbital transfer vehicle configured to switch to maintenance after delivering one or more of the constellation spacecraft from the launch orbit to the orbit of operation. However, with unpredictable time intervals between failures, the maintenance spacecraft may remain idle a large percentage of the time, decreasing the efficiency of the system.

Figures 1A, 1B, 1C:
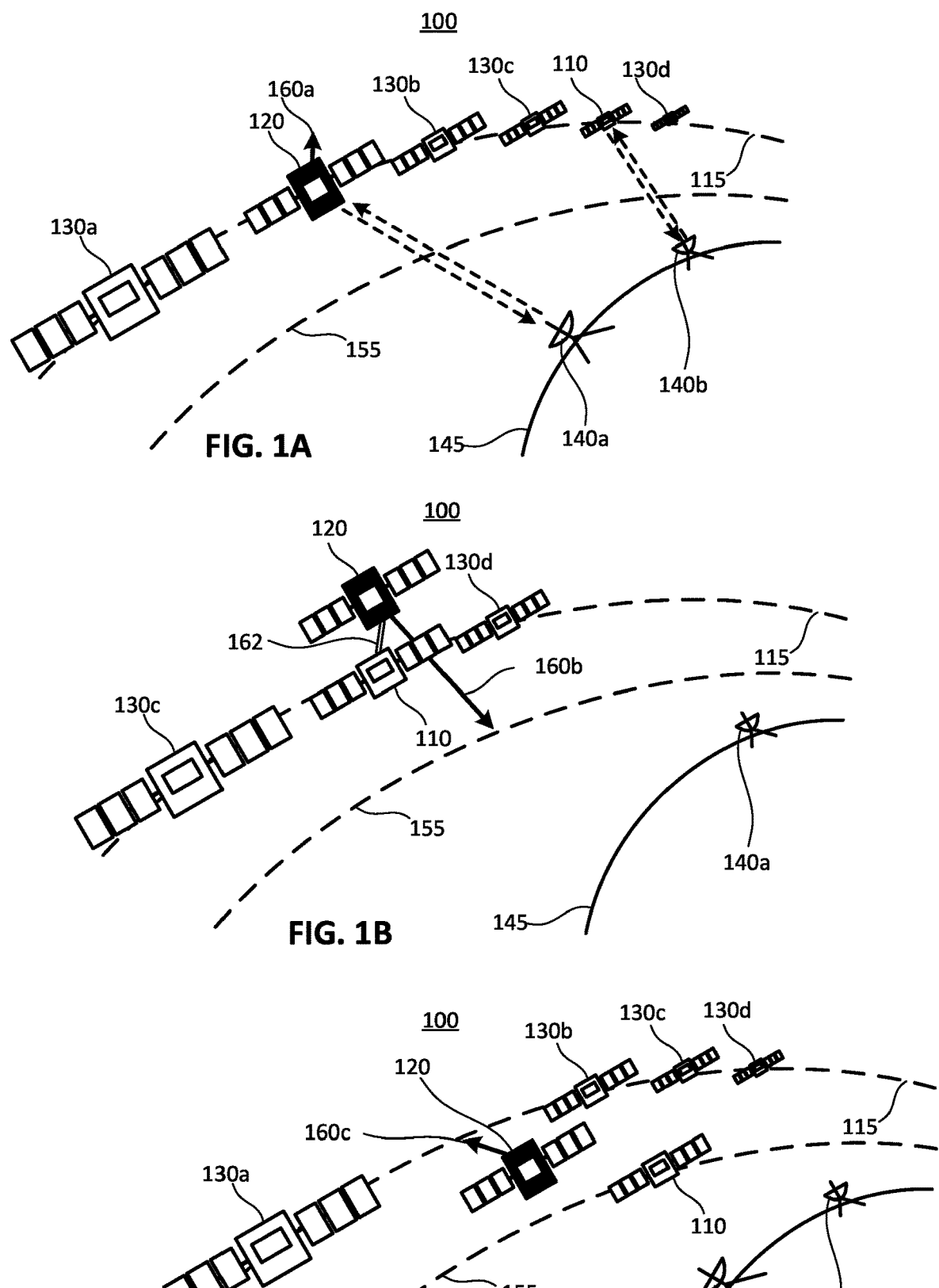
FIGS. 1A-C schematically illustrate an example system for maintenance of a spacecraft constellation.

FIGS. 1A-C schematically illustrate an example embodiment of a system 100 for maintenance of a spacecraft constellation. The system includes a first spacecraft 110 and a second spacecraft 120 configured to maintain a primary orbit 115. Maintaining the primary orbit 115 may include performing maneuvers to limit deviations from a prescribed orbital trajectory to a within a certain distance (e.g., 1, 2, 5, 10, 20, 50, 100, 200 meters or any other suitable distance). Maintaining the primary orbit 115 may include maintaining a prescribed position (e.g., latitude and longitude) at a given time and the dynamic evolution of position as a function of time.

Other spacecraft 130*a*-*d* may be disposed at the primary orbit 115. The spacecraft 110, 120, 130*a*-*d* maintaining the primary orbit 115 may be referred to as satellites. Generally, a spacecraft, as used in the disclosure, may generally refer to a satellite or any other suitable spacecraft. Furthermore, a spacecraft may include orbital transfer capabilities beyond what may be required of a satellite configured primarily to maintain a specific orbit.

Spacecraft 110, 120, and 130*a*-*d* operating in the primary orbit 115 may form at least a portion of a constellation, particularly when configured to cooperatively perform a mission. The mission may include enabling terrestrial communication and/or navigation systems, remote sensing of Earth's surface and atmospheric regions, or any other suitable mission. For example, the spacecraft 110, 120, and 130*a*-*d* may enable substantially uninterrupted communication with a terrestrially-disposed device by handing off a communication link from one spacecraft to another as the spacecraft 110, 120, 130*a*-*d* pass over the terrestrially-disposed device.

Whether or not operating as a constellation, the first spacecraft 110 and the second spacecraft are each configured to perform a primary mission (e.g., communication, navigation, remote sensing, resource storage, etc.) while maintaining the primary orbit 115. The primary orbit 115 may be a low earth orbit (LEO), a very low earth orbit (VLEO), a medium earth orbit (MEO), a Sun-synchronous orbit (SSO), a geo-synchronous orbit (GSO), a geostationary orbit (GEO), a Molniya orbit, or any other suitable orbit. More generally, the primary orbit may be any suitable geocentric elliptical orbit with a semi-major axis of any suitable distance (e.g., 100-50000 km). Furthermore, the techniques of this disclosure are applicable to systems that include spacecraft operating in non-elliptical (e.g., multi-body) and/or non-geocentric (e.g., lunar, planetary, heliocentric, etc.) orbits.

The system 100 may include ground stations 140*a, b* disposed at the Earth's surface 145. Whether the ground stations 140*a, b* are included in of or lie outside of the system 110, the first spacecraft 110 and the second spacecraft 120 may be configured to communicate wirelessly (e.g., using radio and/or optical links) with the ground stations 140*a, b*. The communication signals from the ground stations 140*a, b* may direct and/or influence operations of the spacecraft 110, 120 and may be referred to as telecommand signals. The communication signals from the spacecraft 110, 120 indicative of status and/or performance of the spacecraft 110, 120 to the ground stations 140*a, b* may be referred to as telemetry signals.

At a given time, with the spacecraft 110 and 120 disposed in the primary orbit 115, the second spacecraft 120 may determine a failure of the first spacecraft 110. Determining the failure of the first spacecraft may include receiving, by the second spacecraft 120, an indication of failure indicating failure of the first spacecraft 110. Determining the failure of the first spacecraft 110 need not include determining a type or a mode of failure. Prior to determining the failure of the first spacecraft 110, the second spacecraft 120 may be configured to perform the primary space mission (e.g., communication, remote sensing, resource aggregation and storage, etc.). Responsive to determining the failure of the first spacecraft 110, the second spacecraft may switch to performing a secondary mission. In some embodiments, the second spacecraft 120 may switch to performing the secondary mission contingent on other considerations. For example, switching to the secondary mission may be contingent on the details of the determination of failure, on availability of the second spacecraft, on availability of another spacecraft configured to perform the secondary mission, and/or other considerations. Furthermore, depending on the circumstances, the second spacecraft 120 may be configured to switch to the secondary mission after a suitable delay required to perform a suitable portion of the primary mission. For example, the second spacecraft 120 may switch to performing the secondary mission after a suitable reconfiguration of other spacecraft in a constellation (e.g., spacecraft 130*a*-*d*) to reduce disruption to the primary mission. The second spacecraft 120 may generate and send a communication indicative of switching from the primary mission and/or to a secondary mission. Other spacecraft (e.g., spacecraft 130*a*-*d*) and/or a ground station (e.g., ground station 140*a* or *b*) may receive the communication indicative of switching from the primary to the secondary mission. In response to the received communication, the spacecraft 130*a*-*d* may change, autonomously or in response to ground control, relative positions in the primary orbit 115, for example, to reduce degradation of performance of the primary mission.

In some examples, the second spacecraft 120 may perform the primary mission and the secondary mission contemporaneously, at least during a portion of the secondary mission. That is, the second spacecraft may commence performing the secondary mission in response to determining the failure of the first spacecraft 110 and without abandoning, terminating, or pausing the primary mission. The second spacecraft may reduce the resources devoted to and/or decrease the contribution to the primary mission after commencing the secondary mission. Generally speaking, the primary mission may be a mission performed cooperatively by a plurality of spacecraft in a constellation (e.g., providing a terrestrial communication service). The secondary mission, on the other hand may be a mission performed by a maintenance spacecraft in the service of maintaining the capability of a constellation to perform the primary mission. Only a subset of spacecraft in a constellation may be configured to perform the secondary mission. In particular, the first spacecraft 110 need not be configured to perform the secondary mission. The "primary" and "secondary" modifiers of "mission" do not imply a chronological relationship or a sequence in which a given spacecraft performs the missions.

Determining the failure of the first spacecraft 110 may include determining a type or mode of failure of the first spacecraft 110. The first spacecraft 110 may experience one or more of different types or modes of failure. At least some systems and subsystems in a spacecraft are discussed in more detail below with reference to FIG. 5. A mode of failure may indicate that at least one of the systems or subsystems cannot perform the respective function or may not be able to perform the function at the end of an estimated time window. For example, a failure in a charging system may indicate that the spacecraft may lose ability to communicate in a foreseeable future, i.e., within a certain period of time. On the other hand, a failure in a thruster system may indicate an immediate loss in the ability of the spacecraft 110 to maintain the primary orbit 115. Generally, the failure may include one or both of (i) the first spacecraft losing capability to perform the primary mission, and (ii) the first spacecraft losing capability to maintain the primary orbit.

The second spacecraft 120 may determine the failure of the first spacecraft 110 based on a sequence of events. For example, the first spacecraft 110 may be configured to perform a continuous or periodic diagnostic routine. The diagnostic routine may detect a failure. The first spacecraft 110 may subsequently transmit an indication of failure in a telemetry communication to at least one of the ground stations 140*a, b*. In some examples, the ground station (e.g., ground station 140 *a* or *b*) that receives the indication of failure from the first spacecraft 110 may transmit the tele-command with the indication of failure to the second spacecraft 120 the next time that the ground station establishes a communication link with the second spacecraft 120. In other examples, the ground station (e.g., ground station 140*a*) may transmit the indication of failure to a different ground station (e.g., ground station 140 *b*) via a chain of satellite links and/or a terrestrial communication system. The different ground station (e.g., ground station 140 *b*) may then transmit a telecommand with the indication of failure to the second spacecraft 120.

In other examples, the second spacecraft 120 may receive the indication of failure directly from the first spacecraft 110 or by way of multiple communications between spacecraft (e.g., spacecraft 130 *a-d*) in a constellation. For example, a communication including indication of failure may arrive at the second spacecraft 120 after being relayed from the first spacecraft 110 by spacecraft 130*b, c*. To that end, spacecraft 110, 120, 130*a-d* may be equipped for communicating via direct radio and/or optical links.

In some examples, a spacecraft other than the spacecraft experiencing a failure may generate an indication of failure. For example, spacecraft (e.g., spacecraft 130*c, d*) may include communication links periodically checking in with the first spacecraft 110 and may generate an indication of failure of the first spacecraft 110 based on a failure in establishing a communication link. Additionally or alternatively, spacecraft (e.g., spacecraft 130*c, d*) may include sensors to observe the first spacecraft 110 and generate an indication of failure based on an observed malfunction. For example, neighboring spacecraft 130*c, d* may observe the first spacecraft 110 failing to maintain orbital trajectory, failing to maintain an expected attitude, sustaining damage from a collision with space debris, and/or any other suitable indication of failure.

In other examples, a ground station (e.g., ground stations 140*a, b*) may generate an indication of failure of the first spacecraft 110 based on a failure to establish a communication link, determining that the first spacecraft 110 is in an unexpected location, and/or based on receiving sensor data from other spacecraft (e.g., spacecraft 130*c, d*). Still in other examples, and indication of failure may be based on communications from spacecraft that are not part of the system

100. For example, a space station may determine that the spacecraft 110 is on a course with a probability of collision with the space station or another space asset and may generate a communication to a respective terrestrial control center. The communication may then be received at a terrestrial control center of the system 100, and a ground station (e.g., ground station 140*a, b*). May transmit the indication of failure to the second spacecraft 120 based on the communication received at the terrestrial control center.

The second spacecraft 120 is configured to perform a secondary space mission at least in part in response to determining the failure of the first spacecraft 110 of the first spacecraft 110. The secondary mission may include removing the first spacecraft 110 from the primary orbit 115. In a sense, the second spacecraft 120 may act, in performing the secondary mission, as a maintenance spacecraft. For example, the second spacecraft 120 may move, carry, transport, drag, or tow the first spacecraft 110 from the primary orbit 115 to a service orbit 155. To that end, the second spacecraft 120 may execute a series of maneuvers.

FIGS. 1A, B, and C respectively illustrate maneuvers 160*a, b,* and *c* that the second spacecraft 120 may execute while performing the secondary mission. In FIG. 1A, the second spacecraft 120 performing a primary mission (e.g., delivering communication and information services to terrestrial clients, navigation, remote sensing, etc.) receives a communication from the ground station 140*a*. The communication is indicative of failure of the first spacecraft 110. The first spacecraft 110 may have sent a communication to the ground station 140*b* indicating failure in the capability to perform the primary mission and/or to maintain the primary orbit 115. As discussed above, the indication of failure may have been generated and delivered to the second spacecraft 120 by way of a variety of additional and/or alternative means.

In response to determining the failure of the first spacecraft 110, possibly in conjunction with satisfying other conditions, the second spacecraft 120 initiates a sequence of maneuvers to perform the secondary mission. The second spacecraft 120 may perform the sequence of maneuvers at least in part based on terrestrial control. Additionally or alternatively, the second spacecraft 120 may be configured to perform at least some of the maneuvers of the secondary mission autonomously. The duration of the secondary mission may be 1, 2, 5, 10, 20, 50, 100, 200 or any other suitable number of days.

The secondary mission may include a rendezvous with the first spacecraft 110 experiencing a failure. The second spacecraft 120 may execute the maneuver 160*a* to leave the primary orbit 115, for example to move to a parallel orbit with a different period than the primary orbit 115. In the example of FIG. 1A, the first spacecraft 110 may follow behind (e.g., with a time delay smaller than half of the orbital period) the second spacecraft 120 as the spacecraft 110, 120, and 130*a-d* move counterclockwise along the primary orbit 115. The second spacecraft 120 may, therefore, move to an orbit with a higher altitude and a longer period than the period of the primary orbit 115, effectively allowing the first spacecraft 110 to gain distance along the primary orbit 115. In some examples, the first spacecraft 110 may be ahead of the second spacecraft 120 at the time when the second spacecraft 120 initiates the secondary mission. In such case, the second spacecraft 120 may move down to an orbit with a shorter period than that of the primary orbit 115 to gain distance on the first primary spacecraft 110.

Generally, time to perform orbital maneuvers by the second spacecraft 120 to rendezvous with the first spacecraft 110 depends at least on the initial distance between the spacecraft 110, 120, the period of the primary orbit 115, and the resources of the second spacecraft 120 committed to the rendezvous maneuver. For example, for a given initial configuration of the spacecraft 110 and 120 in the primary orbit 115, the second spacecraft 120 may decrease time to rendezvous by expending more fuel, propellant, or, more generally a larger fraction of total delta-v capacity. In other words, there may be a trade-off between time to rendezvous and committed delta-v resources. An operator interface of the system 100 may prompt an operator for a decision to commit certain delta-v resources or set a rendezvous time limit which may dictate, for example, the magnitude of the maneuver 160a. In some embodiments, an operator of the system 100 may constrain the trade-off, for example, by choosing a minimum time to rendezvous. Additionally or alternatively, one or more processors disposed at one or more terrestrial control centers of the system 100 and/or at the spacecraft 120 may autonomously perform a calculation to allocate resources of the second spacecraft 120 to achieve a certain time to rendezvous in view of details of the failure (e.g., severity, danger posed to other spacecraft, etc.). In one embodiment, the second spacecraft 120 may be configured to compute time to rendezvous and allocate resources autonomously based on information contained in the communication associated with the indication of failure. In another embodiment, the decision for rendezvous time requirements may occur outside of the second spacecraft 120, and the second spacecraft 120 may allocate resources for the rendezvous based at least in part on telecommand. In any case, the information influencing the computation may include the relative locations of the spacecraft 110 in 120 and/or the type of failure.

The secondary mission may further include, after a successful rendezvous, the second spacecraft 120 initiating the orbital maneuver 160b, as depicted in FIG. 1B. The orbital maneuver 160b includes transporting the first spacecraft 110 to the service orbit 155. To that end, the second spacecraft 120 may deploy a deployable mechanical connection device 162 to perform a mechanical connection with the first spacecraft 110. The deployable mechanical connection device 162 may include a robotic arm, a tether, or any other suitable mechanism. A mechanical structure for connecting with the mechanical connection device 162 may be disposed at the first spacecraft 110. In other words, the first spacecraft 110 may be mechanically configured or prepared for forming a mechanical connection and/or docking with the second spacecraft. Mechanical connections between the first spacecraft 110 and the second spacecraft 120 are described in more detail with reference to FIGS. 2A-D.

The secondary mission may further include, after forming a mechanical connection with the first spacecraft 110, the second spacecraft 120 transporting the first spacecraft 110 to the service orbit 155. In some examples, transporting the first spacecraft 110 to the service orbit 155 relies on thrust generated by the second spacecraft 120. In other examples, the second spacecraft 120 may generate at least some thrust required for the orbital maneuver 160b. Using delta-v resources of the first spacecraft 110 may conserve delta-v resources of the second spacecraft 120, increasing efficiency of the system 100. Additionally or alternatively, using thrusters of the first spacecraft 110 may help stabilize and/or maintain angular momentum of the mechanically connected spacecraft 110 and 120. Cooperatively using thrusters at the spacecraft 110 and 120 may be based on a communication link established between the two spacecraft 110 and 120.

Additionally or alternatively, an operator of the system 100 may cooperatively use thrusters of the two spacecraft 110 and 120 by telecommand.

The service orbit 155 may be any orbit suitably minimizing probability of collision with spacecraft (e.g., spacecraft 130a-d) in the primary orbit 115. For example, the service orbit may be disposed at least 20 km below (e.g., in terms of semi-major axis) the primary orbit and at a substantially similar declination. In other examples, the service orbit may be at a different declination than the primary orbit 115. More generally, the service orbit may have an altitude 5 km, 10 km, 20 km, 50 km, 100 km, 200 km or any other suitable distance away from the primary orbit 115. In some embodiments, the service orbit may be a different type of orbit from the primary orbit 115. For example, the service orbit 155 may be a VLEO and the primary orbit may be a LEO. In another example, the service orbit 155 may be a LEO and the primary orbit may be a Molniya orbit. Any other suitable configuration of orbits may be used.

In some embodiments, the service orbit 155 may be accessible by a service spacecraft that may be configured to transport the first spacecraft 110 to a fast-decaying orbit (e.g., a decay time less than 1, 2, 3, 4, or 5 years), as discussed in more detail with reference to FIGS. 3A and B. Additionally or alternatively, the service orbit 155 may serve as a fast-decaying orbit for the first spacecraft 110. To that end, the second spacecraft 120 may position the first spacecraft 110 in the service orbit 155 to substantially increase or maximize drag on the first spacecraft 110.

The secondary mission may further include, after transporting the first spacecraft 110 to the service orbit 155, the second spacecraft 120 returning to the primary orbit 115 with the orbital maneuver 160c schematically depicted in FIG. 1C. In some examples, the second spacecraft 120 may return to the original position with respect to other spacecraft in the primary orbit 115, as illustrated in FIG. 1C. Generally, however, the second spacecraft 120 may return to any other suitable position in the primary orbit 115 and performing the primary mission. Selecting the return position in the primary orbit 115 may include reconfiguring positions within a constellation of the spacecraft 130a-d. The second spacecraft 120 may receive telecommand from a ground station (e.g., ground station 140a or b) indicating where to reenter the primary orbit 115. In some examples, the orbital maneuver 160c may be directed by a terrestrially-based operator of the system 100. Additionally or alternatively, the second spacecraft 120 may perform at least a portion of the maneuver 160c autonomously. To that end, the second spacecraft 120 may coordinate reentry into the primary orbit 115 with other spacecraft (e.g., spacecraft 130a-d) already in the primary orbit 115. At a suitable time, the secondary spacecraft 120 may switch back to performing the primary mission. In some examples, the secondary spacecraft may switch to performing the primary mission before re-entering the primary orbit 115.

The second spacecraft 120 may generate and send a communication indicative of switching from the secondary mission and/or to the primary mission. Other spacecraft (e.g., spacecraft 130a-d) and/or a ground station (e.g., ground station 140a or b) may receive the communication indicative of switching from the secondary to the primary mission. In response to the received communication, the spacecraft (e.g., spacecraft 130a-d) of the system 100 may reconfigure autonomously or in response to ground control, for example, to improve performance of the primary mission.

FIG. 2A-D schematically illustrate example mechanisms for connecting spacecraft (e.g., spacecraft 110, 120, and 130*a-d*) of a system (e.g., system 100) for maintenance of a spacecraft constellation. Spacecraft 210*a-d* represent example configurations of the first spacecraft 110 and/or other constellation spacecraft (e.g., spacecraft 130*a-d*). Spacecraft 220*a-d* represent example configurations of the second spacecraft 120 configured to mechanically connect with the respective spacecraft 210*a-d*.

Figures 2A, 2B, 2C, 2D:
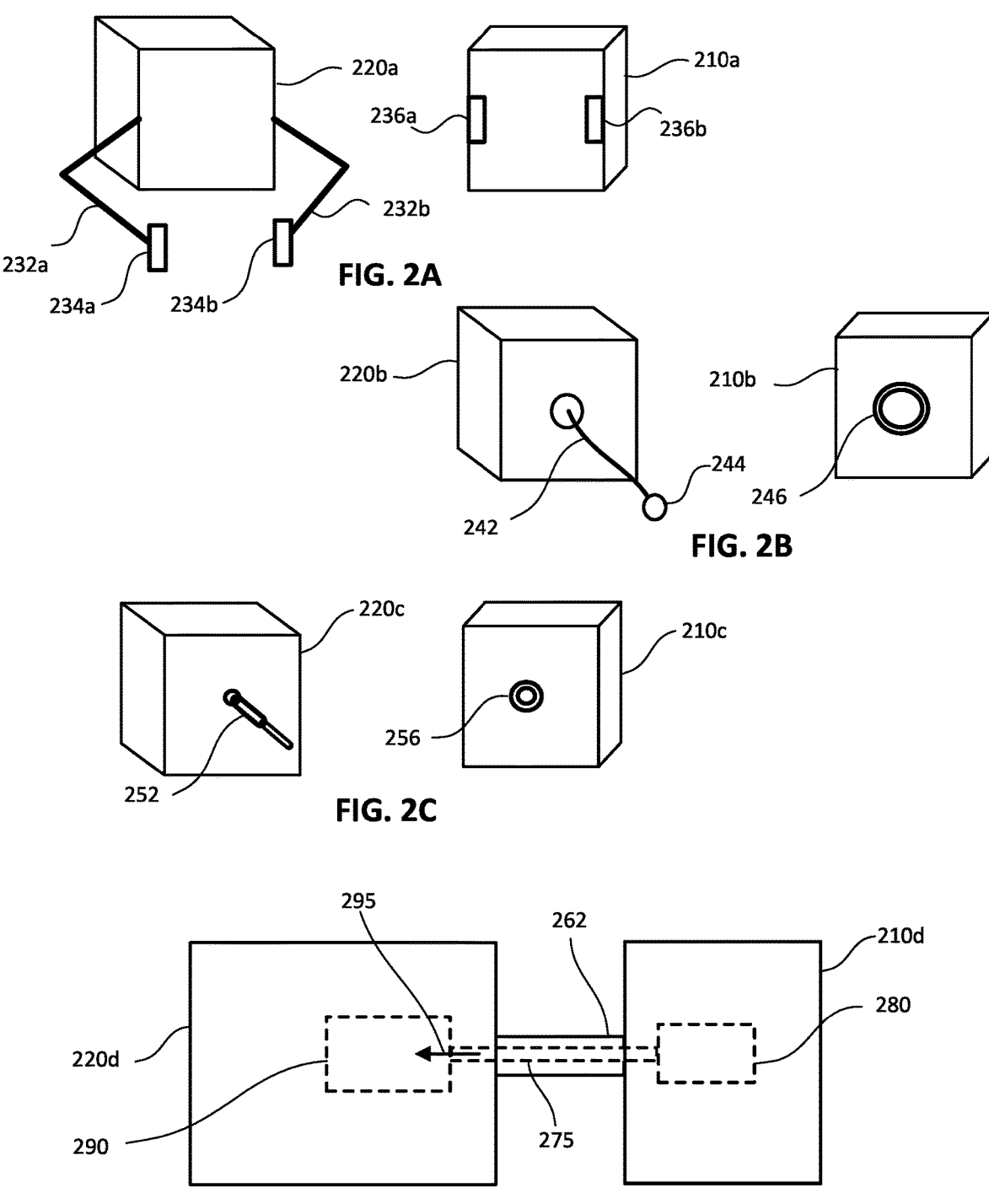
FIG. 2A-D schematically illustrate example mechanisms for connecting spacecraft in a system for maintenance of a spacecraft constellation.

In FIG. 2A, spacecraft 220*a* includes robotic arms 232*a*, *b* terminated with grippers 234*a*, *b*. Spacecraft 210*a* includes handles 236*a*, *b* configured to mate with the grippers 234*a*, *b*. The grippers 234*a*, *b* and the handles 236*a*, *b* may connect via a latching mechanism (e.g., a hook, an articulating hand, etc.), magnets (permanent or electromagnetic), and/or any other suitable mechanism or method. The robotic arms 232*a*, *b* may be deployable. For example, the robotic arms 232*a*, *b* may be folded along the chassis of the spacecraft 220*a* until the spacecraft 220*a* rendezvous with the spacecraft 210*a* and deploys the robotic arms 232*a*, *b* to form a mechanical connection between the two spacecraft 210*a* and 220*a*. In some examples, the robotic arms 232*a*, *b* may stay retracted within the chassis of the spacecraft 220*a* until the rendezvous. Upon releasing the spacecraft 210*a*, spacecraft 220*a* may retract the robotic arms 232*a*, *b*.

The robotic arms 232*a*, *b* and/or the grippers 234*a*, *b* may be powered and actuated to reach and form a connection with the handles 236*a*, *b*. Furthermore, the robotic arms 232*a*, *b* may be configured to change the relative position between the spacecraft 210*a* and 210*b* upon attaching to the spacecraft 210*a*. The robotic arms 232*a*, *b* may bring the spacecraft 210*a* and 220*a* close. Thereupon, an additional mechanism may fasten the spacecraft 210*a* and 220*a*. Furthermore, the robotic arms 232*a*, *b* or the additional mechanism may shift the relative position of the spacecraft 210*a* and 220*a* to adjust the center of mass of the combination of the two spacecraft 210*a* and 220*a* with respect to the thrust produced by the spacecraft 220*a* to aid in maneuvering during the secondary mission.

In some examples, the handles 236*a*, *b* may be passive mechanical structures. In other examples, the handles 236*a*, *b* may be actuated to form a connection with the grippers 234*a*, *b*. The handles 236*a*, *b* may operate from a backup power source in case of a failure of the power system of the spacecraft 210*a*.

In FIG. 2B, spacecraft 220*b* includes a tether 242 terminated with a gripper 244 configured to attach to a gripper socket 246 fixedly or removably disposed at the spacecraft 210*b*. The spacecraft 220*b* may be configured to deploy (e.g., to shoot out) the tether 242 after aligning with the socket 246 of the spacecraft 210*b* during a rendezvous. The grippers 244 and the socket 246 may attach mechanically with a latching mechanism, magnetically, and/or any other suitable method. The socket 246 may be configured for passive alignment with the gripper 244. Additionally or alternatively, the socket 246 may include a powered electromagnet and/or a powered mechanism to align and attach with the gripper 244. The socket 246 may operate from a backup power source in case of a failure of the power system of the spacecraft 210*b*.

In FIG. 2C, spacecraft 220*c* includes a telescopic connector 252 configured to attach to a socket 256 fixedly or removably disposed at the spacecraft 210*c*. The telescopic connector 252 may be actuated by motors, hydraulically, pneumatically, or any other suitable mechanism or method. The telescopic connector 252 may include gripping or latching mechanism. Additionally or alternatively, the telescopic connector 252 may include a sensor probe configured to guide a docking operation. For example, after making an initial contact with the socket 256, the telescopic connector 252 may aid in directing maneuvers of the spacecraft 220*c* into a docked position with the spacecraft 210*c*. In some embodiments, the spacecraft 220*c* may include additional structures and/or mechanisms to securely attach and hold the spacecraft 210*c* and 220*c* in the docked position.

Regardless of the configuration of a mechanical connection device (e.g., robotic arms 232*a*, *b*, tether 242, telescopic connector 252), the spacecraft 220*a-c* may include suitable sensors in aiding the docking (connection, capture, etc.) operation. The sensors may include vision, lidar, radar, and/or any other suitable sensors. A servicing spacecraft (e.g., spacecraft 220*a-c*) may perform the docking, connection, and/or capture operation on a client spacecraft (e.g., spacecraft 210*a-c*) autonomously or with the aid of remote control by telecommand.

In FIG. 2D, spacecraft 220*d* includes a mechanical connector 262 (e.g., connector 252) and a fluidic connector 275 configured to transfer fuel or propellant from a tank 280 disposed at the spacecraft 210*d* to the tank 290 disposed at the spacecraft 220*d*. The spacecraft 220*d* may use the fluidic connector 272 to form a fluidic connection with the spacecraft 210*d* to salvage any remaining fuel or propellant while performing a secondary mission to remove the spacecraft 210*d* from a primary orbit (e.g., orbit 215). In some embodiments, an alternative secondary mission may include refueling the spacecraft 210*d*. To that end, the fluidic connector 275 may be configured to transfer fuel or propellant to the tank 280 from the tank 290.

Figures 3A, 3B:
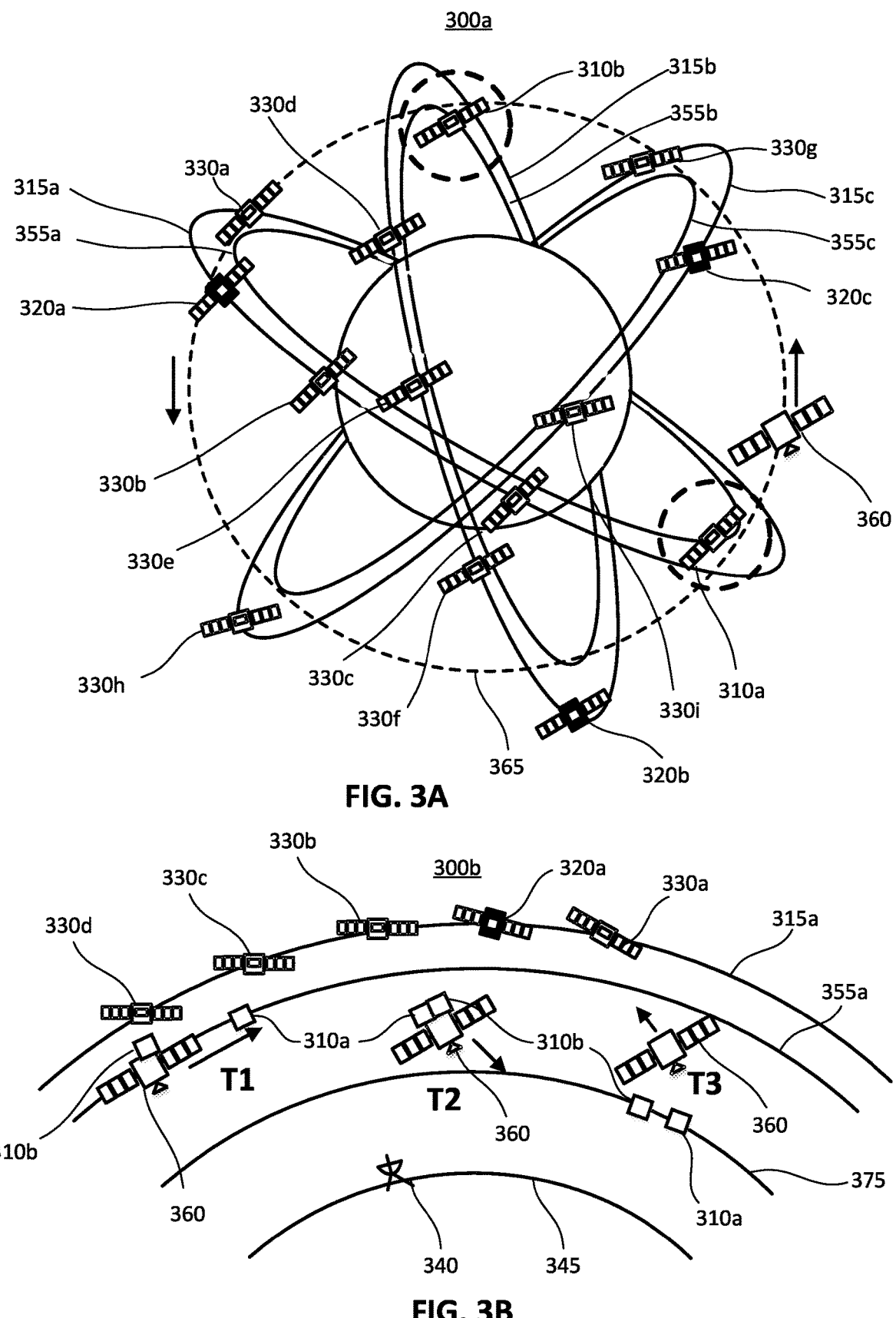
FIG. 3A-B schematically illustrate an example system for maintenance of a spacecraft constellation where the system includes a service spacecraft configured to remove spacecraft from a service orbit.

FIG. 3A-B schematically illustrate an example system 300*a* (e.g., system 100) for maintenance of a spacecraft constellation and managing spacecraft 320*a-c* and 330*a-i* disposed in orbits 315*a-c* (e.g., orbit 115), spacecraft 310*a*, *b*, disposed in respective orbits 355*a*, *b*, and a service spacecraft 360 disposed in an orbit 365. The system 300*a* may be an example of system 100, where the spacecraft 310*a*, *b* may be embodiments of the first spacecraft 210, the spacecraft 320*a-c* may be embodiments of the second spacecraft 220.

In FIG. 3A, the orbits 315 *a-c* are primary orbits (e.g., orbit 115) for performing the primary mission, as described above. The orbits 355*a-c* are service orbits (e.g., orbit 155) to which the spacecraft 310*a*, *b* may be transported, respectively, by the spacecraft 320*a*, *b*. That is, in the example of FIG. 3A, the spacecraft 320A may have transported the spacecraft 310*a* to the orbit 355*a* at least in part in response to receiving a notification of failure of the spacecraft 310*a*. Similarly, the spacecraft 320*b* may have transported the spacecraft 310*b* to the orbit 355*b* at least in part in response to receiving a notification of failure of the spacecraft 310*b*. Furthermore, spacecraft 320*a* may be configured to transport any one of the spacecraft 330*a-c* from the primary orbit 315*a* to the service orbit 355*a* at least in part in response to receiving a notification of failure of the respective spacecraft. Spacecraft 320*a* may be configured to transport one of the spacecraft 330*d-f* from the primary orbit 315*a* to the service orbit 355*a*, and spacecraft 320*b* may be configured to transport one of the spacecraft 330*g-i* from the primary orbit 315*b* to the service orbit 355*b*. Prior and subsequently to completing the secondary mission of transporting spacecraft 310*a*, *b* and 330*a-i* from primary orbits 315*a-c* to service orbits 355*a-c*, spacecraft 320*a-c* may perform the primary mission along with the spacecraft 330*a-c* when disposed in the primary orbits 315*a-c*.

The service spacecraft 360 may be configured to rendezvous with spacecraft 310*a, b* at the respective service orbits 355*a, b*. To that end, the service spacecraft 360 may be configured to follow the orbit 365 configured to substantially intersect the service orbits 355*a-c* at suitable intervals. In some embodiments, the service spacecraft 360 is configured to precess through orbital declinations and/or ascending node longitudes with a period of less than three years. The service spacecraft 360 may be disposed at an altitude marginally below the service orbits 355*a, b* with a differential nodal regression. In other embodiments, the service spacecraft 360 may follow an inter-orbital flight path to service orbits 355*a, b* at altitudes substantially different from the service orbits 355*a-c*.

The service spacecraft 360 may be configured to transport spacecraft in the service orbits 355*a-c* and/or other spacecraft to fast-decaying orbits to accelerate deorbiting of out-of-commission spacecraft. In some embodiments, the service spacecraft 360 may be configured to transport one or more spacecraft (e.g., spacecraft in the service orbits 355*a-c*) to "graveyard" orbits, i.e., orbits that need not be fast-decaying but that are disposed suitably far from operating space systems. In a sense, the service spacecraft 360 may act as a disposal spacecraft.

FIG. 3B schematically illustrate an example system 300*b* (which may be system 100 or system 300*a*), where the service spacecraft 360 is configured to transport spacecraft 310*a, b* to a fast-decaying orbit 375. The fast-decaying orbit may be at an altitude of less than 200 km above the earth's surface or any other suitable altitude at from which a spacecraft's altitude may decay (e.g., due to drag) at a suitable rate. For example, for the fast-decaying orbit may have a lifetime of less than three years for a target spacecraft. The service spacecraft 360 may be configured to simultaneously carry and transport multiple spacecraft to the fast-decaying orbit or another suitable orbit. Carrying multiple spacecraft simultaneously may improve the efficiency of utilization of delta-v resources (e.g., fuel or propellant) of the service spacecraft 360.

At time T1, the service spacecraft 360 may approach and rendezvous with the spacecraft 310*a* in the service orbit 355*a* while transporting the spacecraft 310*b*, having previously docked with the spacecraft 310*b* in the service orbit 355*b*. At time T2, the service spacecraft 360 may transport the spacecraft 310*a, b* to the fast-decaying orbit 375. At time T3, having dropped off (e.g., transported and released) the spacecraft 310*a, b* at the fast-decaying orbit 375, the service spacecraft 360 may return to a suitable flight path (e.g., orbit 365).

In some embodiments, an operator and/or one or more terrestrially-based controllers of the system 100 may guide at least some of the operations performed by the service spacecraft 360 by telecommand from a ground station 340 (which may be an embodiment of the ground station 140*a* or 140*b*) disposed at a planetary surface 345 (e.g., surface 145). Additionally or alternatively, the service spacecraft 360 may perform at least some of the operations autonomously. The service spacecraft 360 may include suitable mechanical connection devices and/or sensors to dock with and transport the spacecraft 310*a, b*. Furthermore, the service spacecraft 360 may be configured with more delta-v capacity than the second spacecraft 120 (or spacecraft 320*a-c*) which may, in turn, be configured with more delta-v capacity than the primary spacecraft 110 (or spacecraft 310*a, b*, 130*a-d*, 330*a-i*).

It should be noted that the system 100 may generally include more than one maintenance spacecraft in at least one of the primary orbits (e.g., orbits 115, 315*a-c*). For example, if the second spacecraft 320*a* in orbit 315*a* fails, the second spacecraft 320*a* may generate a notification of failure. In response to receiving the notification of failure, the secondary spacecraft 320*b* in orbit 315*b* may switch from the primary mission to transport the secondary spacecraft 315*a* to the service orbit 355*a*. The secondary spacecraft 320*b* may then return to either the original primary orbit 315*b* or may replace the secondary spacecraft 320*a* in the primary orbit 315*a*.

Spacecraft configured to perform both primary and secondary missions (e.g., secondary spacecraft 120, 320*a-c*) may have larger space envelopes during launch than the spacecraft that may be configured primarily for the primary mission (e.g., spacecraft 110, 210, 130*a-d*, 330*a-i*). The larger size may accommodate bigger thruster, a bigger fuel or propellant tank, a mechanical connection device for connecting to a spacecraft experiencing a failure, and/or any other sub-systems for performing the secondary mission. Space launches of constellations described in the disclosure may be configured with efficient launch vehicle configurations accommodating the different types of spacecraft.

Figure 4:
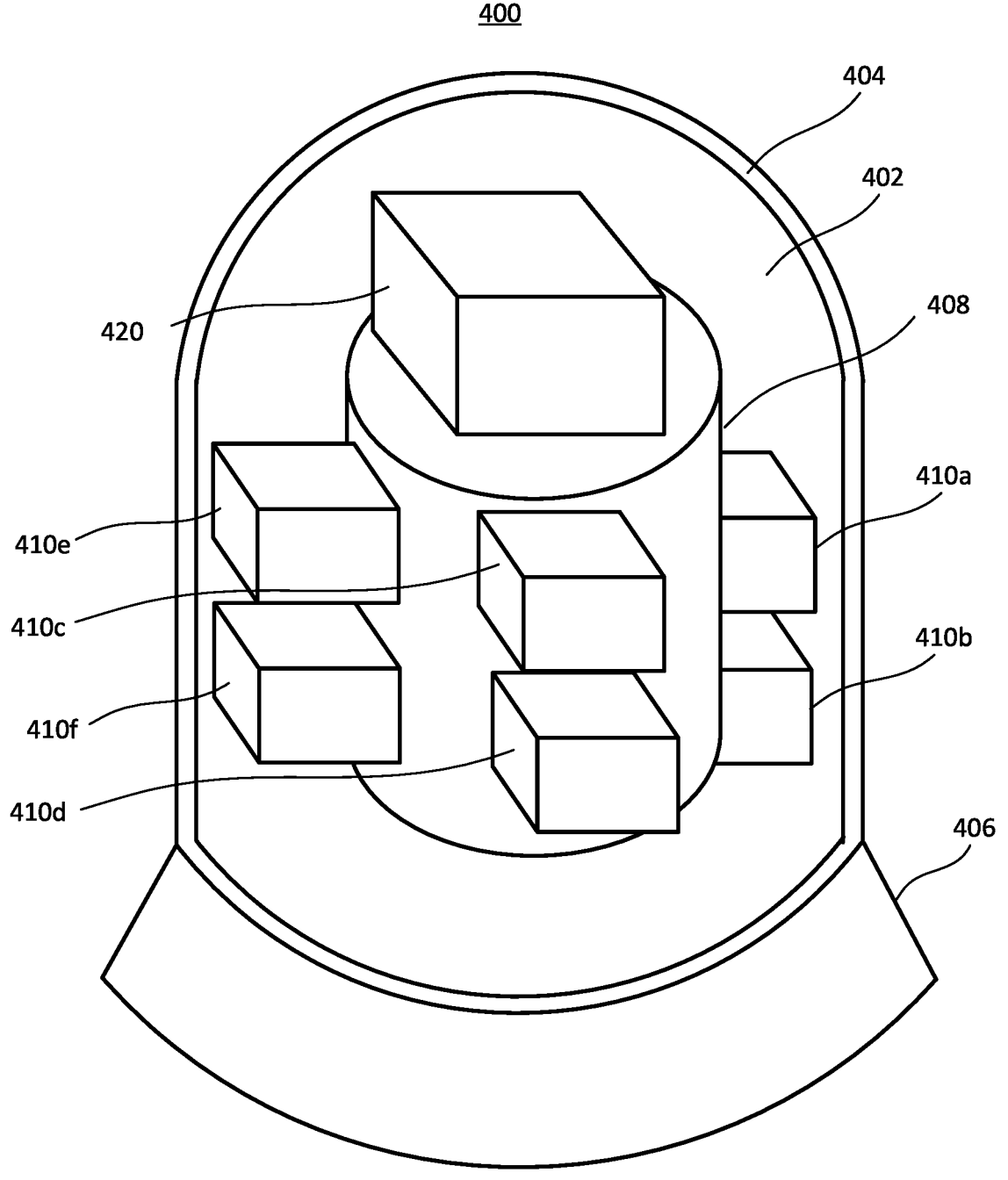
FIG. 4 schematically illustrates an example launch vehicle configuration in a system for maintenance of a spacecraft constellation.

FIG. 4 schematically illustrates an example launch vehicle configuration 400 for a system (e.g., system 100) for maintenance of a spacecraft constellation. The system having a launch configuration 400 may include a payload be 402 encased in a fairing 404 and attached to a rocket stage 406. The system may include, within the launch vehicle configuration 400, a payload adapter structure, or, simply, payload adapter 408. The payload adapter 408 may have rotational symmetry. The payload adapter 408 may be configured to accommodate similarly sized spacecraft 410*a-f* removably attached along the sides of or radially around the adapter 408. The similarly sized spacecraft 410*a-f* may be configured (e.g., as spacecraft 110, 130*a-d*, 310*a, b*, 330*a-i*) primarily for the primary mission. On the other hand, a larger spacecraft 420, configured for both the primary and the secondary missions (e.g., as spacecraft 120 and 320*a-c*) may be removably attached at the head of the payload adapter 408, along the axis of the payload adapter 408 and/or the rocket stage 406. Configuring the similarly sized spacecraft 410*a-f* in a rotationally symmetrical manner around the payload adapter structure 408 and the larger spacecraft 420 at the head, makes an efficient use of space in the payload bay. Additionally or alternatively, the configuration, as illustrated in FIG. 4, aids in a symmetrical distribution of weigh within the launch vehicle.

Figure 5:
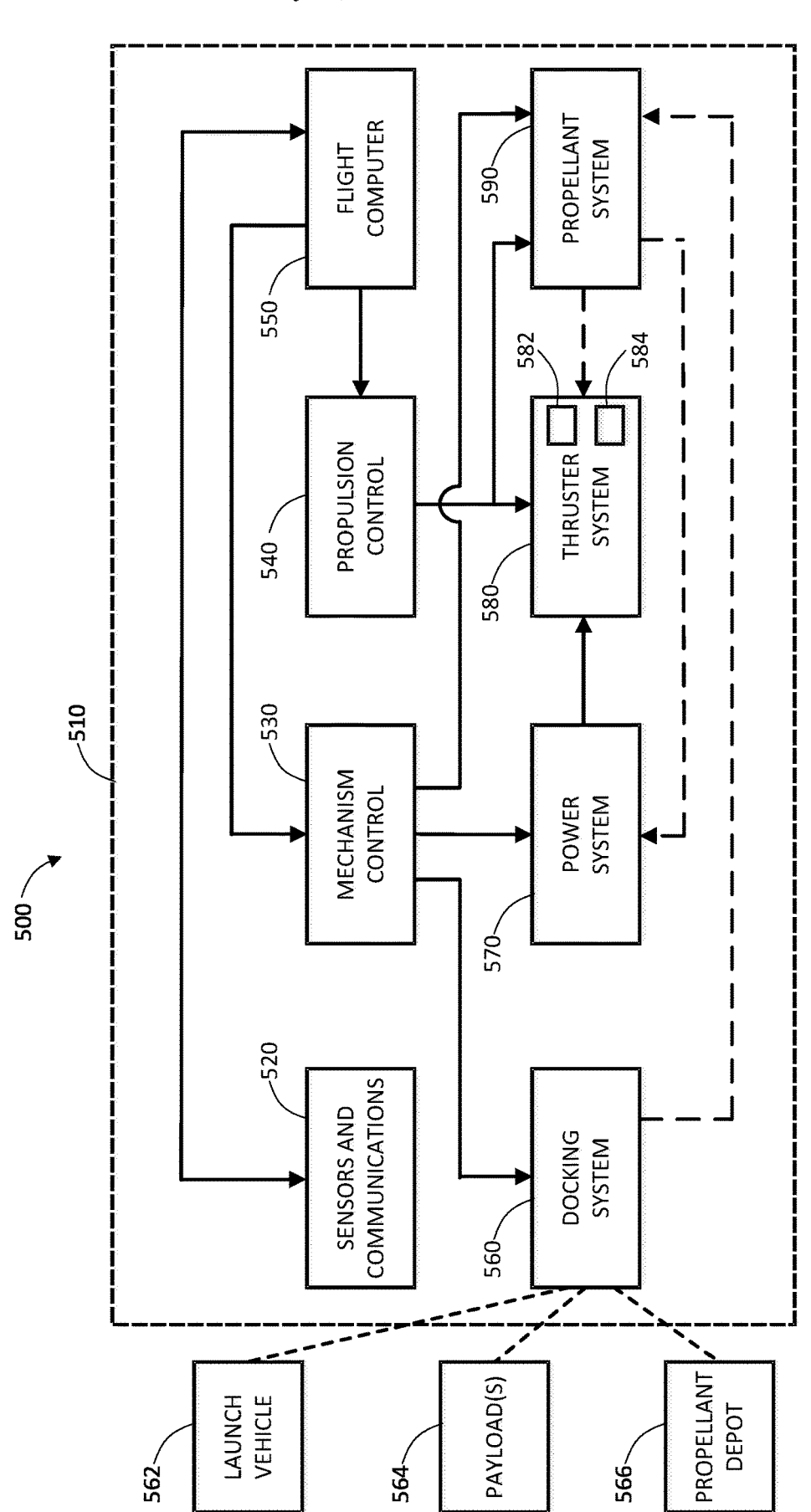
FIG. 5 is a block diagram of an example spacecraft that may be used in a system for maintenance of a spacecraft constellation.

FIG. 5 is a block diagram of an example spacecraft 500 configured for performing a primary and a secondary mission (e.g., spacecraft 120, 320*a-c*, 420), where the secondary mission includes transporting a spacecraft experiencing a failure (e.g., spacecraft 110, 310*a, b*) to a service orbit. The implementations of a spacecraft management system management system (e.g., system 100) may depend on and interact with a variety of components and/or parameters of operation of the spacecraft 500. It should be noted that description of the many of the systems, subsystems, units, components, and/or parameters of operation of the spacecraft 500 may generally apply to the spacecraft configured primarily for the primary mission (e.g., spacecraft 110, 130*a-d*, 310*a, b*, 330*a-i*, and 410*a-f*) and to a service spacecraft (e.g., spacecraft 360).

The spacecraft 500 includes a number of systems, subsystems, units, or components disposed in, on, and/or coupled to a housing 510. The subsystems of the spacecraft 500 may include sensors and communications components 520, mechanism control 530, propulsion control 540, a flight computer 550, a docking system 560 (for attaching to a launch vehicle 562, one or more payloads 564, a propellant depot 566, etc.), a power system 570, a thruster system 580 that includes a primary propulsion (main) thruster subsystem 582 and an attitude adjustment thruster subsystem 584, and a propellant system 590. It should be noted that the main thruster subsystem 582 may be capable of considerably larger thrust than a thruster system of a spacecraft configured primarily for the primary mission. On the other hand, a thruster system of a maintenance or a service spacecraft may be capable of larger thrust that the thruster system 580.

The one or more payloads 564 may include, for example the spacecraft 110, 130*a-d*, 310*a, b*, 330*a-i*, and 410*a-f*. The docking system 590 may include the mechanical connection devices 232*a, b*, 234*a, b*, 242, 252, 262 described above with reference to FIGS. 2A-D.

Any combination of subsystems, units, or components of the spacecraft 500 involved in determining, generating, and/or supporting spacecraft propulsion (e.g., the mechanism control 530, the propulsion control 540, the flight computer 550, the power system 570, the thruster system 580, and the propellant system 590) may be collectively referred to as a propulsion system of the spacecraft 500.

The sensors and communications components 520 may include a number of sensors and/or sensor systems for navigation (e.g., imaging sensors, magnetometers, inertial motion units (IMUs), Global Positioning System (GPS) receivers, etc.), temperature, pressure, strain, radiation, and other environmental sensors, as well as radio and/or optical communication devices to communicate, for example, with a ground station, and/or other spacecraft. The sensors and communications components 520 may be communicatively connected with the flight computer 550, for example, to provide the flight computer 550 with signals indicative of information about spacecraft position and/or commands received from a ground station. The sensors and communication components 520 may include the sensors and communications specific to performing the secondary mission.

The flight computer 550 may include one or more processors, a memory unit, computer readable media, to process signals received from the sensors and communications components 520 and determine appropriate actions according to instructions loaded into the memory unit (e.g., from the computer readable media). Generally, the flight computer 550 may be implemented using any suitable processing hardware, such as, for example, a digital signal processing (DSP) circuit, an application-specific integrated circuit (ASIC), a field programmable gate array (FPGA), and/or a microprocessor configured to executed software instructions stored in a memory unit. More generally, the flight computer 550 may be implemented with any suitable electronic hardware and/or software components. The flight computer 550 may generate control messages based on the determined actions and communicate the control messages to the mechanism control 530 and/or the propulsion control 540. For example, upon receiving signals indicative of a position of the spacecraft 500, the flight computer 550 may generate a control message to activate one of the thruster subsystems 582, 584 in the thruster system 580 and send the message to the propulsion control 540. The flight computer 550 may also generate messages to activate and direct sensors and communications components 520.

The docking system 560 may include a number of structures and mechanisms to attach the spacecraft 500 to a launch vehicle 562, one or more payloads 564 (e.g., the spacecraft 120 *a-f*, 320 *a-f*), and/or a propellant refueling depot 566. The docking system 560 may be fluidicly connected to the propellant system 590 to enable refilling the propellant from the propellant depot 566. Additionally or alternatively, in some embodiments at least a portion of the propellant may be disposed on the launch vehicle 562 and outside of the spacecraft 500 during launch. The fluidic connection between the docking system 560 and the propellant system 590 may enable transferring the propellant from the launch vehicle 562 to the spacecraft 500 upon delivering and prior to deploying the spacecraft 500 in orbit. Additionally or alternatively, the fluidic connection between the docking system 560 and the propellant system 590 may enable transferring the propellant using the connection 275 as described with reference to FIG. 2D.

The power system 570 may include components for collecting solar energy, generating electricity and/or heat, storing electricity and/or heat, and delivering electricity and/or heat to the thruster system 580. To collect solar energy, the power system 570 may include solar panels (e.g., solar array 160) with photovoltaic cells, solar collectors or concentrators with mirrors and/or lenses, or a suitable combination of devices. In the case of using photovoltaic devices, the power system 570 may convert the solar energy into electricity and store it in energy storage devices (e.g., lithium-ion batteries, fuel cells, etc.) for later delivery to the thruster system 580 and other spacecraft components. In some embodiments, the power system 580 may deliver at least a portion of the generated electricity directly (i.e., bypassing storage) to the thruster system 580 and/or to other spacecraft components. When using a solar concentrator, the power system 570 may direct the concentrated (having increased irradiance) solar radiation to photovoltaic solar cells to convert to electricity. In other embodiments, the power system 570 may direct the concentrated solar energy to a solar thermal receiver or simply, a thermal receiver, that may absorb the solar radiation to generate heat. Still furthermore, using a solar concentrator, the power system 570 may perform electrolysis for generating chemical components for propulsion as described above. The power system 570 may use the generated heat to power a thruster directly and/or to generate electricity using, for example, a turbine or another suitable technique (e.g., a Stirling engine). The power system 570 then may use the electricity directly for generating thrust or storing electrical energy.

The thruster system 580 may include a number of thrusters (e.g., thrusters 170*b* or 570) and other components configured to generate propulsion or thrust for the spacecraft 500. Thrusters may generally include main thrusters in the primary propulsion subsystem 582 that are configured to substantially change speed of the spacecraft 500, or as attitude control thrusters in the attitude control thruster subsystem 584 that are configured to change direction or orientation of the spacecraft 500 without substantial changes in speed.

One or more thrusters in the primary propulsion subsystem 582 may be MET thrusters. In a MET thruster cavity, an injected amount of propellant (e.g., delivered via the liquid propellant transfer unit 120) may absorb energy from a microwave source (that may include one or more oscillators) included in the thruster system 580 and, upon partial ionization, further heat up, expand, and exit the MET thruster cavity through a nozzle, generating thrust.

Another one or more thrusters in the primary propulsion subsystem 582 may be solar thermal thrusters. In one embodiment, propellant in a thruster cavity acts as the solar thermal receiver and, upon absorbing concentrated solar energy, heats up, expands, and exits the nozzle generating thrust. In other embodiments, the propellant may absorb heat before entering the cavity either as a part of the thermal target or in a heat exchange with the thermal target or another suitable thermal mass thermally connected to the thermal target. In some embodiments, while the propellant may absorb heat before entering the thruster cavity, the primary propulsion thruster subsystem 582 may add more heat to the propellant within the cavity using an electrical heater or directing a portion of solar radiation energy to the cavity.

Other types of thrusters may also be used. For example, the primary propulsion subsystem 582 may also include chemical, electrical, hybrid thrusters and/or combination of thrusters (e.g., hybrid thrust).

Thrusters in the attitude adjustment subsystem 584 may use propellant that absorbs heat before entering the cavities of the attitude adjustment thrusters in a heat exchange with the thermal target or another suitable thermal mass thermally connected to the thermal target. In some embodiments, while the propellant may absorb heat before entering thruster cavities, the thrusters of the attitude adjustment thruster subsystem 584 may add more heat to the propellant within the cavity using corresponding electrical heaters. Likewise, propellant may be evaporated in heat exchangers prior to the supply of propellant into high temperature electrolysis units.

The propellant system 590 may store the propellant for consumption in the thruster system 580. The propellant may include water, hydrogen peroxide, hydrazine, ammonia, or another suitable substance. The propellant may be stored on the spacecraft in solid, liquid, and/or gas phase. To that end, the propellant system 590 may include one or more tanks, including, in some embodiments, deployable tanks. To move the propellant within the spacecraft 500, and to deliver the propellant to one of the thrusters, the propellant system 590 may include one or more pumps, valves, and pipes. The propellant may also store heat and/or facilitate generating electricity from heat, and the propellant system 590 may be configured, accordingly, to supply propellant to the power system 570. In some embodiments, one or more electrolysis units may be configured to run in reverse as fuel cells to generate electricity.

The mechanism control 530 may activate and control mechanisms in the docking system 560 (e.g., for attaching and detaching a payload or connecting with an external propellant source), the power system 570 (e.g., for deploying and aligning solar panels or solar concentrators), and/or the propellant system 590 (e.g., for changing the configuration of one or more deployable propellant tanks). Furthermore, the mechanism control 530 may coordinate interaction between subsystems, for example, by deploying a tank in the propellant system 590 to receive propellant from an external propellant source connected to the docking system 560.

The propulsion control 540 may coordinate the interaction between the thruster system 580 and the propellant system 590, for example, by activating and controlling electrical components (e.g., a microwave source) of the thruster system 540 and the flow of propellant supplied to thrusters by the propellant system 590. Additionally or alternatively, the propulsion control 540 may direct the propellant through elements of the power system 570. For example, the propellant system 590 may direct the propellant to absorb the heat (e.g., at a heat exchanger) accumulated within the power system 570. Vaporized propellant may then drive a power plant (e.g., a turbine, a Stirling engine, etc.) of the power system 570 to generate electricity. Additionally or alternatively, the propellant system 590 may direct some of the propellant to charge a fuel cell within the power system 590. Still further, the attitude adjustment thruster subsystem 584 may directly use/consume the heated propellant to generate thrust.

The subsystems of the spacecraft 500 may be merged or subdivided in different embodiments. For example, a single control unit may control mechanisms and propulsion. Alternatively, dedicated controllers may be used for different mechanisms, thrusters (e.g., including a thruster of the present disclosure), valves, etc. In the preceding discussion, a "controller" may refer to any portion or combination of the mechanism control 530 and/or propulsion control 540.

It may be noted that the spacecraft of this disclosure may include at least some of the systems and/or components discussed with respect to the spacecraft 500. For example, components of the sensor and communications system 520, propulsion control 540, flight computer 550, power system 570, and/or thruster system 580 may be adapted for the different spacecraft to implement mission objectives.

FIG. 6 is a block diagram of a method 600 for maintenance of a spacecraft constellation. In other words, the method 600 is an example method of operating a system (e.g., system 100) for maintenance of a spacecraft constellation.

At block 610, the method 600 includes performing, by a first spacecraft (e.g., spacecraft 110, or 310a, b), a primary mission while maintaining a primary orbit (e.g., orbit 115, 315). The first spacecraft may be one of a plurality of spacecraft performing the primary mission while maintaining the primary orbit. The primary orbit may be a low earth orbit (LEO), a very low earth orbit (VLEO), a medium earth orbit (MEO), a Sun-synchronous orbit (SSO), a geo-synchronous orbit (GSO), a geostationary orbit (GEO), a Molniya orbit, or any other suitable orbit. The primary mission may include at least one of: communication, navigation, remote sensing, resource storage, etc. For example, the primary mission may include providing continuous communication service at a terrestrial point or object. To that end, the first spacecraft may operate in a constellation with additional spacecraft. As a suitable position it the primary orbit, the first spacecraft may establish a communication link and begin communicating with the fixed terrestrial point. At a different position in the primary orbit, the first spacecraft may hand over the communication link to one of the additional spacecraft in the constellation.

At block 620, the method 600 includes performing, by a second spacecraft (e.g., spacecraft 120, 320a-c, 420), the primary mission. In some embodiments, the first spacecraft and the second spacecraft may operate in a constellation. For example, the second spacecraft may be one of the additional spacecraft in the constellation with the first spacecraft performing the primary mission that includes providing continuous communication service at a terrestrial point or object. The terrestrial point or object may be a fixed point or object or a mobile point or object. For example, a mobile object may be an aircraft in flight.

At block 630, the method 600 includes determining, by the second spacecraft, a failure of the first spacecraft. Determining the failure of the first spacecraft may be based on receiving an indication of failure sent by the first spacecraft, another spacecraft, or a ground station (e.g., ground station 145a, b). Additionally or alternatively, determining the failure may be based at least in part on one or more computations performed by one or more processors disposed at the second spacecraft (e.g., at the flight computer 550). The computations may be based at least in part on sensor data obtained using sensors disposed at the second spacecraft (e.g., sensors and communications unit 520). Determining the failure may include determining that the first spacecraft can no longer perform the primary mission. Additionally or alternatively, determining the failure may include determining that the first spacecraft can no longer maintain the primary orbit. The failure may include a failure in one or more of the systems, subsystems, units, and/or components of the first spacecraft, such as, for example, the systems, subsystems, units, and/or components of the second spacecraft, as discussed with reference to FIG. 5.

In some examples, determining the failure may include receiving an indication of failure generated by the first spacecraft. For example, the first spacecraft may run a diagnostic routine to determine whether at least one of the spacecraft components have failed or are about to fail and generate the indication of failure in response to the results of the diagnostic routine. Additionally or alternatively, the first spacecraft may be in communicative connection with one or more other spacecraft in a constellation and/or a ground station (e.g., ground station 145*a*, *b*, or 345), and generating an indication of failure may be in response to a failure to receive an expected communication from the one or more other spacecraft and/or the ground station. The first spacecraft may emit a beacon indicating a failure. Additionally or alternatively, the spacecraft may emit a beacon indicating normal operation and/or absence of a failure. The beacon may be a radio beacon or an optical beacon. Determining the failure of the first spacecraft may include receiving (e.g., the beacon indicated failure) or not receiving (e.g., beacon indicating normal operation) the beacon signal.

In some examples, determining the failure may include receiving an indication of failure generated by a spacecraft other than the first spacecraft. For example, neighboring spacecraft operating in a constellation may be in communicative connections with one another. Additionally or alternatively, neighboring spacecraft operating in a constellation may observe one another using one or more sensors. In any case, a spacecraft neighbor into the first spacecraft may generate the indication of failure based on either observing the failure of the first spacecraft and/or failing to receive an expected communication from the first spacecraft.

The second spacecraft may determine the failure of the first spacecraft based on receiving an indication of failure from a ground station (e.g., ground station 145*a*, *b*, 345), from the first spacecraft, and/or from another spacecraft. For example, determining the failure of the first spacecraft 110 may be based on receiving or detecting a beacon indicative of failure. Additionally or alternatively, determining the failure of the first spacecraft 110 may be based on not receiving a beacon indicative of absence of failure (i.e., normal operation) of the first spacecraft. Generally, determining the failure of the first spacecraft 110 may be based on data generated by one or more sensors of the second spacecraft or obtained by communication system of the second spacecraft.

At block 640, the method 600 includes performing, by the second spacecraft and at least in part responsive to determining the failure of the first spacecraft 110, a secondary mission. The secondary mission may include removing the first spacecraft from the primary orbit by the second spacecraft. Additionally or alternatively, the second mission may include removing space debris from the primary orbit. In some examples, the space debris may be a cause of the failure of the first spacecraft. In other examples, the space debris may be a result of the failure of the first spacecraft. Still another examples, the space debris may be disposed in the vicinity of the first spacecraft, and removing the space debris may be accomplished in addition to removing the first spacecraft from the primary orbit.

Removing the first spacecraft from the primary orbit by the second spacecraft may include a series of operations as described above with reference to FIGS. 1A-C, 2A-D, and 3A, B. The series of operations may include an orbital maneuver by the second spacecraft to rendezvous with the first spacecraft, a docking operation, and an orbital transfer operation from the primary orbit to a service orbit (e.g., orbit 155, 355*a-c*). The second spacecraft may include a deployable mechanical connection device to enable capture and transport of the first spacecraft. The first spacecraft may include a mechanical structure to prepare for capture and transport. In some embodiments, performing the secondary mission may include capturing by the secondary spacecraft objects (e.g., first space spacecraft and/or space debris) that lack mechanical structures corresponding to the deployable mechanical connection device.

The method 600 may optionally include transporting, by a service spacecraft, the first spacecraft from the service orbit to a fast-decaying disposal orbit (e.g., orbit 175). Additionally or alternatively, the method 600 may include servicing the first spacecraft in the service orbit by the service spacecraft. For example, the service spacecraft may refuel the first spacecraft, add a mission extension module to the first spacecraft, and/or repair or replace a broken component causing the failure of the first spacecraft. The service spacecraft may serve multiple constellations in multiple orbits and, to that end, may have orbital transfer capabilities beyond those of the first and the second spacecraft.

The method 600 may optionally include contemporaneous launching of the first spacecraft and the second spacecraft into orbit. To that end, the system may include a payload adapter structure with the first spacecraft and other similarly sized spacecraft removably attached (e.g., in a symmetrical configuration around the payload adapter). The payload adapter structure may be disposed at a launch vehicle prior to and during launch. The second spacecraft may be removably attached at the head of the payload adapter, as discussed with respect to FIG. 4. The first spacecraft and the second spacecraft may detach from the payload adapter and deploy in a launch orbit. In some embodiments, the launch orbit may be coincident with or near the primary orbit. In other embodiments, the launch orbit may be at a substantively different elevation from the primary or orbit. The second spacecraft may be configured to serve as an orbital transfer vehicle (ATV) and transport one or more spacecraft including the first spacecraft to the primary orbit from the launch orbit.

In other examples, the method may include launching the first spacecraft and the second spacecraft in separate launches. When launched separately, the second vehicle may nevertheless act as an ATV for the first spacecraft and/or other spacecraft.

It should be noted that at least some of the operations discussed with reference to FIG. 6 may be performed with the aid of telecommands sent from one or more command centers by way of one or more ground stations. Other operations may be performed autonomously by the spacecraft, as described above.

What is claimed is:

1. A system for maintenance of a spacecraft constellation, the system comprising:

a first spacecraft configured to perform a primary mission while maintaining a primary orbit;

a second spacecraft that includes a deployable mechanical tethering device, wherein the second spacecraft is configured to:

perform the primary mission while maintaining the primary orbit;

determine a failure of the first spacecraft, wherein determining the failure of the first spacecraft includes receiving, by the second spacecraft, a telecommand from a ground station; and at least in part responsive to determining the failure of the first spacecraft, perform a secondary mission, wherein the secondary mission includes removing the first spacecraft from the primary orbit by the second spacecraft, wherein to remove the first spacecraft from the primary orbit, the secondary mission further includes:

performing, by the second spacecraft, an orbital maneuver to rendezvous with the first spacecraft;

deploying, by the second spacecraft, the deployable mechanical tethering device to form a mechanical connection with the first spacecraft; and transporting the first spacecraft to a service orbit; and a third spacecraft configured to:

rendezvous with the first spacecraft at the service orbit; and either (i) service the first spacecraft at the service orbit, or (ii) move the first spacecraft to a fast-decaying disposal orbit.

2. The system of claim 1, wherein the third spacecraft is configured to precess through orbital declinations and/or ascending node longitudes with a period of less than three years.

3. The system of claim 1, wherein the fast-decaying disposal orbit has a lifetime of less than three years.

4. The system of claim 1, wherein the third spacecraft is configured to move an additional spacecraft contemporaneously with moving the first spacecraft to the fast-decaying disposal orbit.

5. The system of claim 1, wherein the first spacecraft includes a mechanical structure configured to connect with the deployable mechanical tethering device of the second spacecraft.

6. The system of claim 1, wherein the second spacecraft is further configured to:

dock with the first spacecraft;

remove fuel and/or propellant from the first spacecraft; and store the removed fuel and/or propellant at the second spacecraft.

7. The system of claim 1, wherein the service orbit is at least 20 km below the primary orbit.

8. The system of claim 1, wherein the second spacecraft is further configured to move the first spacecraft from a launch orbit to the primary orbit.

9. The system of claim 1, wherein the first spacecraft and the second spacecraft are part of a constellation configured to provide a communication service.

10. The system of claim 1, wherein:

the first spacecraft includes a first propulsion system;

the second spacecraft includes a second propulsion system; and the second propulsion system is capable of higher total delta-v than the first propulsion system.

11. The system of claim 10, wherein:

the second propulsion system includes a microwave-electro-thermal thruster.

12. The system of claim 1, wherein:

the first spacecraft is configured to emit a beacon signal;

the second spacecraft is configured to receive the beacon signal emitted by the first spacecraft; and determining the failure of the first spacecraft includes receiving or not receiving the beacon signal.

13. The system of claim 1, wherein the second spacecraft is further configured to remove debris from the primary orbit.

14. The system of claim 1, wherein the first spacecraft and the second spacecraft are configured to operate in a constellation with a plurality of additional spacecraft substantially identical to the first spacecraft, the constellation disposed at the primary orbit.

15. The system of claim 14, wherein:

the first spacecraft and the second spacecraft are configured to be contemporaneously removably attached to a payload adapter structure of a launch vehicle.

16. The system of claim 1, wherein:

the failure of the first spacecraft includes one or both of (i) the first spacecraft losing capability to perform the primary mission, and (ii) the first spacecraft losing capability to maintain the primary orbit.

17. The system of claim 1, wherein:

the system includes a third spacecraft configured to perform the primary mission and to generate an indication of failure of the first spacecraft based at least in part on one or both of:

(i) detecting, by the third spacecraft, a malfunction of the second spacecraft; and (ii) failing to detect or receive, by the third spacecraft, a beacon or a communication from the first spacecraft;

the second spacecraft is further configured to receive the indication of failure generated by the third spacecraft; and determining, by the second spacecraft, the failure of the first spacecraft is based at least in part on receiving, by the second spacecraft, the indication of failure generated by the third spacecraft.

18. A method for maintenance of a spacecraft constellation, the method comprising:

performing, by a first spacecraft, a primary mission while maintaining a primary orbit;

performing, by a second spacecraft that includes a deployable mechanical tethering device, the primary mission while maintaining the primary orbit;

determining, by the second spacecraft, a failure of the first spacecraft, wherein determining the failure of the first spacecraft includes receiving, by the second spacecraft, a telecommand from a ground station;

performing, by the second spacecraft and at least in part responsive to determining the failure of the first spacecraft, a secondary mission, wherein performing the secondary mission includes removing the first spacecraft from the primary orbit by the second spacecraft, wherein performing the secondary mission further includes:

performing, by the second spacecraft, an orbital maneuver to rendezvous with the first spacecraft;

deploying, by the second spacecraft, a deployable mechanical connection device to form a mechanical connection with the first spacecraft; and transporting, by the second spacecraft, the first spacecraft to a service orbit;

maneuvering, by a third spacecraft, to rendezvous with the first spacecraft at the service orbit; and either (i) servicing the first spacecraft at the service orbit, or (ii) transporting the first spacecraft to a fast-decaying disposal orbit.

19. The method of claim 18, wherein the fast-decaying disposal orbit has a lifetime of less than three years.

20. The method of claim 18, further comprising:

moving, by the third spacecraft, an additional spacecraft contemporaneously with moving the first spacecraft to the fast-decaying disposal orbit.

21. The method of claim 18, further comprising:

docking, by the second spacecraft, with the first spacecraft;

removing, by the second spacecraft, fuel and/or propellant from the first spacecraft; and storing the removed fuel and/or propellant at the second spacecraft.

22. The method of claim 18, wherein the service orbit is at least 20 km below the primary orbit.

23. The method of claim 18, further comprising:

moving by the second spacecraft, the first spacecraft from a launch orbit to the primary orbit.

24. The method of claim 18, further comprising:

providing, by the first spacecraft and the second spacecraft as a part of a constellation performing the primary mission, continuous communication service at a fixed terrestrial point.

25. The method of claim 18, further comprising:

emitting, by the first spacecraft, a beacon signal; and receiving, by the second spacecraft, the beacon signal emitted by the first spacecraft, wherein determining, by the second spacecraft, the failure of the first spacecraft includes receiving or not receiving the beacon signal.

26. The method of claim 18, further comprising:

removing, by the second spacecraft, space debris from the primary orbit.

27. The method of claim 18, further comprising:

removably attaching the first spacecraft and the second spacecraft at a payload adapter structure of a launch vehicle;

contemporaneously delivering, by the space vehicle, the first spacecraft and the second spacecraft to a launch orbit; and detaching, at the launch orbit, the first spacecraft and the second spacecraft from the payload adapter structure.

28. The method of claim 18, wherein:

the failure of the first spacecraft includes one or both of (i) the first spacecraft losing capability to perform the primary mission, and (ii) the first spacecraft losing capability to maintain the primary orbit.

29. The method of claim 18, further comprising:

performing, by a third spacecraft, the primary mission;

generating, by the third spacecraft, an indication of failure based at least in part on one or both of:

(i) detecting, by the third spacecraft, a malfunction of the second spacecraft; and (ii) failing to detect or receive, by the third spacecraft, a beacon or a communication from the first spacecraft;

receiving, by the second spacecraft, the indication of failure generated by the third spacecraft; and wherein determining, by the second spacecraft, the failure of the first spacecraft is based at least in part on receiving, by the second spacecraft, the indication of failure generated by the third spacecraft.

* * * * *